3,694,231
PROCESS FOR PREPARING SHELF-STABLE, FREE-FLOWING DEHYDRATED CHEESE PRODUCTS IN GRANULATED OR POWDERED FORM
Henry J. Izzo, Somerset, and Charles O. Burton, Oradell, N.J., assignors to Gentry Corporation, Fair Lawn, N.J.
No Drawing. Filed Aug. 17, 1970, Ser. No. 64,582
Int. Cl. A23c 19/02
U.S. Cl. 99—115          9 Claims

ABSTRACT OF THE DISCLOSURE

Free-flowing dehydrated cheese products in powdered, crumbled or granulated form are prepared by simultaneously introducing chunks of cheese and liquefied cryogenic gas into a comminution chamber so that the cheese is frozen and ground. The resulting comminuted cheese particles are dried from the frozen state in a fluidized bed while maintaining a temperature below about 21° C.

---

The present invention relates to shelf-stable finely divided cheese products and to an improved method for preparing them. More particularly, this invention relates to a method for preparing free-flowing, granulated, crumbled, or powdered cheese characterized by low water content and substantially no loss in the flavor, aroma, melting and color characteristics of the natural cheese product from which it is made.

For many years there has been a well-recognized commercial need for a finely divided cheese product which is shelf-stable, that is, which may be sprinkled easily from a container for immediate consumption without a problem of the cheese particles caking or forming lumps. The lumping or caking of powdered cheeses in the container from which they are applied, or in which they are stored, is attributable to the moisture content of the cheese. High moisture content in cheeses also causes color degradation after a relatively short time. This color degradation has in the past been masked by artificial color additives while anti-caking agents have been added to prevent lumping.

It is generally known that granulated or powdered cheeses can be made shelf-stable for a period of nine months to one year by reducing the water content to a maximum of about 18%, thereby preventing mold and bacterial growth and lumping. Conventional techniques for drying solid moist foods, such as spray drying or freeze drying, are however, not satisfactory for preparing a free-flowing dehydrated cheese product having the same organoleptic properties, especially flavor, aroma, melting and color characteristics, of the fresh cheese from which the product is prepared. The difficulties in preparing dry cheese products by conventional dehydration operations stem to a great extent from the complex biochemical make-up of cheese itself which has created a number of problems not present in the treatment of other foods.

Consequently, those drying methods which use high temperatures and prolonged exposure of the product to drying conditions only result in scorching or burning of cheese and a loss of the desirable volatile components which account for the distinctive aroma and flavor of fresh cheese. For instance, when cheese is spray dried, it is subjected to air at a temperature ranging from about 275–300° F. and thus, the cheese reaches a temperature of about 212° F. as a result, denaturization of the cheese protein, which normally takes place at temperatures above 120° F., occurs. Denaturization is particularly troublesome since it is an irreversible chemical change. Cheese containing substantial amounts of denatured protein will not melt and it will cake at about 5% moisture content. A typical spray drying process for making granulated cheese is described in the Rogers et al. Pat. No. 3,056,681.

Some of the problems encountered in preparing dehydrated cheese by spray drying, such as protein denaturization, have been overcome to a limited extent by drying frozen cheese particles under a sufficiently high vacuum to sublime the water content. This method, commonly referred to as "freeze drying," has not been entirely satisfactory since substantial amounts of the volatile flavor components of the treated cheese are lost during the lengthy drying operation. In addition, freeze drying is quite expensive in comparison to other food dehydrating techniques. Freeze drying has been used for drying soft cheese, such as cottage cheese, baker's cheese, Neufchatel cheese, farmer's cheese, buttermilk cheese, and the like, in the preparation of a dehydrated cheese product which on rehydration or reconstitution will physically resemble the original cheese. The Flosdorf et al. Pat. No. 2,789,909 describes such a process for treating soft cheese. While freeze dried, reconstituted soft cheese has a texture similar to the original cheese, the flavor, color and aroma of the freeze dried product in its dehydrated form is totally unacceptable for immediate consumption and as a shelf-stable cheese product.

Vacuum drying of frozen particles which have been admixed with an absorbent material, such as silica gel, is also unsatisfactory for dehydrating cheese since the separated cheese products of both hard and soft cheeses are noticeably inferior in color, aroma and flavor as compared with the natural cheese starting materials. This type of drying operation is described in the Tival Pat. No. 1,979,124.

The prior processes specifically developed for preparing dehydrated cheese, such as Pat. Nos. 2,576,597 to Gootgeld and 2,789,909 to Florsdorf et al., have only been concerned with soft cheese, and particularly, reconstitutable soft cheese. All attempts at preparing a commercially acceptable dehydrated cheese product from hard cheeses other than Romano and Parmesan have failed.

The limitation of prior processes to soft cheeses and the inability to satisfactorily dehydrate most hard cheeses may again be attributed to the biochemical complexity of cheese. Cheese, of course, consists mainly of coagulated milk casein, fat and water. The biochemical mechanism for converting milk casein first into curd and finally into cured cheese is not completely understood. It is known, however, that the different classes of cheese, namely, hard, soft and semi-hard or intermediate cheese, and the many varieties within these respective classes, are made possible only to a limited extent by selection of the particular type of milk starting material. These differences are primarily due to variations in the essential conditions during the two-phase cheese making process, ripening and curing. The complexity of cheese chemistry is somewhat exemplified by the fact that certain hard cheeses, such as Parmesan and Romano cheese having a maximum moisture content of about 32% and 34%, respectively, are readily dehydrated by known techniques to a granulated, free-flowing form which is shelf-stable for prolonged time periods.

Variations in cheese-making process conditions, therefore, account for the fact that the different varieties of cheese vary in their moisture content, aroma, color, flavor and melt characteristics. Of the hard type, the most common of which are Cheddar and Swiss (Emmenthaler), moisture content is a maximum of about 40%. Bleu, Roquefort, Leicester, Gouda, brick and mozzarella are semi-hard or intermediate cheeses which are generally defined to have a moisture content in the range of about 39–50%. Soft cheeses, such as Neufchatel, limburger, Camembert, ricotta, farmer's cheese, baker's cheese, pot cheese, cream cheese, and cottage cheese, have a moisture content not less than about 50%. These wide differences in moisture content of soft and hard cheese create several distinct and separate problems for dehydrating all classes and varieties of cheeses by one process.

Accordingly, it is the purpose of the present invention to provide a process for preparing free-flowing dehydrated cheese products in powdered, crumbled, or granulated form having the texture, appearance, taste and general qualities of the cheese from which it is made, which is economically competitive with prior art techniques, and which is equally satisfactory for the treatment of all classes and varieties of cheese.

It is a further object of the present invention to provide a process for preparing dehydrated free-flowing cheese products which have desirable melting characteristics and minimum flavor loss due to the volatilization of the desirable flavor and aroma components of the fresh cheese.

It has now been found, according to the present invention, that a free-flowing, dehydrated cheese product having substantially no loss in the flavor, aroma, color, and melt characteristics of the fresh cheese from which it is made may be prepared by a low temperature comminuting and drying process. Accordingly, a powdered or granulated dry soft or hard cheese product of satisfactory quality can be prepared by (1) simultaneously feeding cheese and a liquefied cryogenic gas into a comminuting chamber; (2) reducing the temperature of the cheese to about −210° C. to −150° C.; (3) comminuting the frozen cheese in an atmosphere of cryogenic gas to a particle size of about ¼ inch to 30 microns, the liquid cryogenic gas being continuously fed into the comminution chamber at a rate sufficient to insure that the finely divided cheese leaving the chamber is in the form of free-flowing particles at a temperature of about −150° C.; (4) transferring the comminuted frozen cheese at a temperature not higher than −10° C. to a fluidized air bed dryer; and (5) drying the frozen cheese to a maximum moisture content of about 18% by weight of the total dehydrated cheese product without raising the temperature of the cheese particles above about 24° C., preferably 21° C. The air entering the fluidized air bed dryer is at a temperature of about 5° C. to 10° C. and a maximum relative humidity of 60%. The air flowing through the bed may be heated to and maintained at a temperature between 16° C. and 24° C. as long as the relative humidity does not exceed 60%. The phenomenon whereby the moisture content within the cheese product can be lowered without the destruction of the natural flavors, aroma and color characteristics of the fresh cheese is achieved by the novel combination of reducing the particle size of the cheese by simultaneously freezing and comminuting the cheese prior to a controlled, low temperature drying operation. It is believed that the simultaneous freezing and low temperature grinding step allows the moisture in the interior of the cheese to be easily removed by the low temperature dehydration step.

In accordance with the present invention, the cheese is simultaneously comminuted and treated with a liquefied cryogenic gas which reduces the temperature of the cheese to below about −150° C.

The cryogenic gas, such as nitrogen gas, is fed directly into the comminution chamber simultaneously with chunks of untreated cheese. The cryogenic gas is preferably in the liquid state, but it may be partially in the liquid state and partially in the gaseous state. The cryogenin is permitted to contact and commingle with the cheese to reduce its temperature to between −10° C. to −210° C. or below. Temperatures above about −10° C. have been found to unfavorably affect the physical structure of the cheese attained by the low temperature grinding operation thereby resulting in a dehydrated product of inferior quality. Furthermore, it is preferred that the grinding operation be carried out in an oxygen free atmosphere consisting essentially of an inert gas such as nitrogen, thereby diminishing the oxidation of the flavor and aroma characteristics of the cheese. Other inert cryogenic gases, such as carbon dioxide, ammonia, zenon, krypton, argon, neon, helium, and chlorinated and fluorinated hydrocarbons are also suitable.

In order to obtain a satisfactory granulated or powdered product, the cheese should be comminuted to a particle size of about ¼ inch to 30 microns. The rate at which cheese is fed into the comminution chamber will vary depending upon the type and size of comminuting device employed. In carrying out the method of this invention, any grinding apparatus capable of being adapted for operation in an atmosphere of cryogenic gas may be utilized. Suitable apparatus includes hammer mills, stone mills, bowls mills, roller mills, abrasion mills, attrition mills, pebble mills, air jet mills, colloid mills, grinders, crushers, cutters, and the like. Operating speeds for hammer mill types to provide an adequately ground material are from 1,000 to 14,000 r.p.m., once again depending upon the apparatus used. The finely divided frozen cheese leaving the comminution chamber should be in free-flowing form.

We have discovered that to produce a satisfactory dehydrated cheese in powdered form for immediate consumption, the grinding operation previously described must be coupled with a carefully controlled drying procedure. It has been found that not only are the precise temperature and moisture condition of the drying operation critical, but also the basic nature of the dehydration operation itself. Other techniques are all too expensive or inadequate for the reasons previously mentioned.

According to the present invention, therefore, frozen, comminuted cheese at a temperature of not higher than −10° C. is dried in a fluidized bed under precisely controlled conditions to a maximum moisture of about 18%. The initial temperature of the air in the fluid drying bed is about 5° C. to 10° C. and within about 5 to 10 minutes it is heated to a temperature of about 16° C. to 24° C. The air flowing through the bed should not have a relative humidity exceeding about 60%. The rate of air flow up through the bed should be between about 1,000 and 10,000 cubic ft./min., depending on amount of product being dried. Depending upon the amount of moisture originally present in the cheese, the drying operation is continued for about 45 minutes to 2 hours until the water content is reduced to about 18% by weight of the total product. In addition, it is essential that the temperature of the cheese never be allowed to rise above about 24° C., preferably 21° C., during the drying operation. High temperatures during the drying operation have been found to unfavorably affect the quality of the final product. Specifically, high temperatures drive off flavor and promote oiling off thereby retarding drying and causing the cheese particles to cake. Oil on the surface of the cheese particles causes development of off-flavors and rancidity and retards dehydration.

The following examples are provided to illustrate the process for carrying out the present variations and are not intended to limit its scope in any way:

EXAMPLE 1

300 pounds of bleu cheese having a moisture content of 45% by weight and liquid nitrogen were simultaneously fed into the grinding chamber of a Fitzpatrick Hammer Mill which had been precooled to a temperature of −250° C. This mill operated at a speed of 7,000 r.p.m. and had screens with openings of 0.0078 inch in diameter. The bleu cheese was introduced into the hammer mill at a rate of 300 pounds per hour and the liquid nitrogen was introduced into the grinding chamber at the rate of 600 pounds per hour (2 pounds of liquid nitrogen per pound of bleu cheese). The 300 pounds of bleu cheese were ground in the hammer mill until the particle size of the cheese was reduced to less than 0.0078 inch in diameter. Care was taken during this grinding operation to maintain the temperature of the grinding chamber at —225° C. After the grinding step was completed, the product was removed from the grinding chamber. The temperature of the product upon leaving the grinding chamber was about —170° C. The ground frozen product was then allowed to stand for a few hours until it reached a temperature of —12° C.

After this period, 30 pounds of the above ground product at a temperature of —12° C. was introduced into a fluidized bed type dryer having an air velocity of 2,500 cubic feet per minute. The air temperature in this dryer was between 10° C. and 13° C. and the air had a relative humidity of between 15% and 30%. The drying was carried out for a period of one hour and fifteen minutes without raising the temperature of the cheese to greater than 16° C. After this period, the dried, ground cheese was removed from the dryer. The final product was a free-flowing blue cheese powder having a moisture content of 18% by weight.

EXAMPLE 2

400 pounds of mozzarella cheese with a moisture content of 46% by weight was fed into a Fitzpatrick Hammer Mill having the characteristics outlined in Example 1. Simultaneously with the addition of the mozzarella cheese to the grinding chamber of the Fitzpatrick Hammer Mill, there was also added to the grinding chamber, liquid nitrogen at the rate of 600 pounds per hour (1.5 pounds of nitrogen to 1 pound of cheese). Prior to the addition of mozzarella cheese and liquid nitrogen to the grinding chamber of the hammer mill, the grinding chamber had been precooled to a temperature of —250° C. The mozzarella cheese was ground in the hammer mill until its particle size was reduced to less than 0.0078 inch in diameter. Care was taken so that the temperature of the grinding chamber during the operation was maintained at —225° C. After the grinding was completed, the product was removed from the grinding chamber. The temperature of the product upon being removed from the grinding chamber was —170° C. This ground, frozen product was allowed to stand for a few hours until it reached a temperature of —12° C. However, care was taken that the temperature of the ground frozen product was kept at about —12° C. during this period of standing.

Thirty pounds of this product at a temperature of —12° C. was fed into a fluidized bed type dryer having an air velocity of 2,500 cubic feet per minute, and an air temperature of between 13° C. to 16° C., said air having a relative humidity of from 15% to about 30%. Care was taken so that the temperature of the cheese during drying never was greater than 10° C. After one and a half hours in the dryer, the cheese was removed. The moisture content of the dried powdered mozzarella cheese was 18% by weight.

EXAMPLE 3

Fifty pounds of Cheddar cheese having a moisture content of 36% was cut into one inch cubes. The temperature of the cut cheese was about 4° C. 18% by weight of an anti-caking material consisting of whey, starch, salt, calcium silicate and sorbic acid was added to the cheese. This mixture was divided into two separate thirty pound batches which were both treated in the following manner: Each batch of cheese was fed into the grinding chamber of a hammer mill simultaneously with liquid nitrogen which was being metered into the grinding chamber. The rate of feed of the cheese and additives combined was about 480 lbs. per hour. The rate of liquid nitrogen feed was about 500 lbs. per hour. The speed of the hammer mill was 3,500 r.p.m. and the size of the screen openings of the hammer mill was ½ inch, resulting in a particle size of ¼ inch or less coming out of the grinding chamber. The coarsely ground frozen cheese at about —200° C. was collected in a fiber drum. The cheese was then transferred from the fiber drum to the container of a fluidized air bed dryer without allowing the temperature of the cheese to reach —10° C. The container was then positioned in the dryer and the dryer started. Air at 9° C. and 40% relative humidity was drawn through the dryer at about 2,500 c.f.m. The air was heated to about 16° C. as it passed through the plenum of the dryer and before coming into contact with the cheese. The cheese was then allowed to dry for ninety minutes. Upon removal from the dryer the cheese product temperature was about 15° C.

The first batch of cheese was found to have 14.5% moisture. The second batch of cheese had about 15%.

Forty-four pounds of the coursely ground cheese at about 14.75 moisture from a combination of the first and second batches was then finely ground through a hammer mill under the following conditions:

Nitrogen feed rate approximately 600 lbs./hr.
Mill speed 7000 r.p.m.
Screen opening on mill chamber approximately 1/64 inch.

The resulting powdered cheese product was free-flowing during its frozen state and also upon reaching room temperature. At room temperature, the powdered, free-flowing cheese had the same odor and taste characteristics as the original cheese from which it was prepared.

EXAMPLE 4

Fifty pounds of farmer's cheese (cottage cheese type) having a moisture content of 80% was mixed at about 4° C. with 50% by weight of an anti-caking material consisting of whey, starch, salt, calcium silicate and potassium sorbate. The resulting material resembled a heavy dough which was broken into smaller pieces and fed into the grinding chamber of a hammer mill. At the same time, liquid nitrogen was metered into the grinding chamber. The speed of the hammer mill was 3,000 r.p.m. and the size of the screen openings of the hammer mill was ½ inch, resulting in a particle size of ¼ inch or less. The material from the grinding chamber was collected in a fiber drum and the temperature of the product was about —200° C. The coarsely ground frozen cheese was then transferred from the fiber drum to the container of a fluid bed dryer without allowing the temperature of the cheese to reach —10° C.

The container was then positioned in the fluidized bed dryer and the dryer started. Air at a temperature of 12° C. was drawn through the dryer at a rate of about 2,500 c.f.m. The air was heated to about 18° C. as it passed through the plenum of the dryer before coming into contact with the cheese. The cheese was then allowed to dry for approximately 180 minutes. Upon analysis, the moisture content of the cheese was found to be 17%.

Soft cheese prepared in this manner must be carefully treated with anti-caking agent so as not to mask the natural flavor of the cheese which is of a very weak character. To improve the flavor of dehydrated soft cheeses, therefore, the original moisture content of the cheese is preferably reduced by physically squeezing it prior to mixing with the anti-caking material. For example, the soft cheese may be placed in cheese cloth and mechanically pressed to separate the excess enclosed water. As a result, the pressed cheese would then be mixed with a relatively small amount of anti-caking material in the range of 15% to 20%.

Thus, in accordance with the present invention, free-flowing shelf-stable cheese products are prepared in powdered or granulated form. These powdered cheese products are characterized by the texture, appearance and overall organoleptic properties of the cheese material from which it was made.

There are, of course, many modifications and variations of the present invention which will suggest themselves to those skilled in the art. However, nothing in the preceding specification is intended to limit the invention as defined by the appended claims.

We claim:

1. A method for preparing a shelf-stable, free-flowing dehydrated cheese product in granulated, crumbled, or powdered form which comprises the steps of
   (a) simultaneously feeding cheese and liquefied cryogenic gas into a comminution chamber;
   (b) reducing the temperature of the cheese to about $-210°$ C. to $-150°$ C.;
   (c) comminuting the frozen cheese, in an atmosphere consisting essentially of the crygenic gas, to a particle size ranging from about ¼ inch to 30 microns while maintaining the temperature of the cheese at about $-210°$ C. to $-150°$ C., the liquid cryogenic being continuously fed into the comminution chamber at a rate sufficient to insure that the finely divided cheese leaving the chamber is in the form of free-flowing particles at a temperature of about $-150°$ C.;
   (d) transferring the comminuted frozen cheese at a temperature not higher than $-10°$ C. to a fluidized bed air dryer; and
   (e) drying the cheese to a maximum moisture content of about 18% by weight of the total dehydrated product in a fluidized air bed having an air temperature between about 16° C. and 24° C., and a maximum relative air humidity of 60%, while maintaining the temperature of the cheese below about 21° C.

2. A method according to claim 1 wherein the atmosphere in the comminution chamber is oxygen-free.

3. A method according to claim 1 wherein the rate of the air flow through the fluidized bed is between about 1,000 and 10,000 cubic feet per minute.

4. A method according to claim 1 wherein the liquified cryogenic gas is selected from the group consisting essentially of nitrogen, carbon dioxide, ammonia, zenon, krypton, argon, neon, helium, and chlorinated and fluorinated hydrocarbons.

5. A method according to claim 4 wherein the cryogenic gas is partially in the liquid state and partially in the gaseous state.

6. A method according to claim 1 wherein the cheese is hard cheese having a maximum moisture content of about 40%.

7. A method according to claim 6 wherein the hard cheese is Cheddar cheese.

8. A method according to claim 1 wherein the cheese is a semi-hard or intermediate cheese having a moisture content ranging from 39% to 50%.

9. A method according to claim 1 wherein the cheese is a soft cheese having a moisture content not less than about 50%.

References Cited
UNITED STATES PATENTS

| | | | |
|---|---|---|---|
| 1,979,124 | 10/1934 | Tival | 99—199 |
| 3,056,681 | 10/1962 | Rogers | 99—115 |
| 3,128,192 | 4/1964 | Valcaleris | 99—116 |
| 3,184,318 | 5/1965 | McCadam | 99—115 |

RAYMOND N. JONES, Primary Examiner

U.S. Cl. X.R.

99—199